F. VAN DOREN.

Carriage-Truck.

No. 68,811

Patented Sept 10, 1867.

Witnesses.
Theo Tusche
Wm Erwin.

Inventor:
Francis Van Doren
Per Munn & Co

United States Patent Office.

FRANCIS VAN DOREN, OF ADRIAN, MICHIGAN.

Letters Patent No. 68,811, dated September 10, 1867.

---

IMPROVEMENT IN SKID AND FRICTION-ROLLER.

---

The Schedule referred to in these Letters Patent and making part of the same.

---

TO ALL WHOM IT MAY CONCERN:

Be it known that I, FRANCIS VAN DOREN, of Adrian, Lenawee county, Michigan, have invented a new and improved Skid and Friction-Roller; and I do hereby declare that the following is a full, clear, and exact description thereof, which will enable others skilled in the art to make and use the same, reference being had to the accompanying drawings, forming part of this specification, in which—

Figure 1:
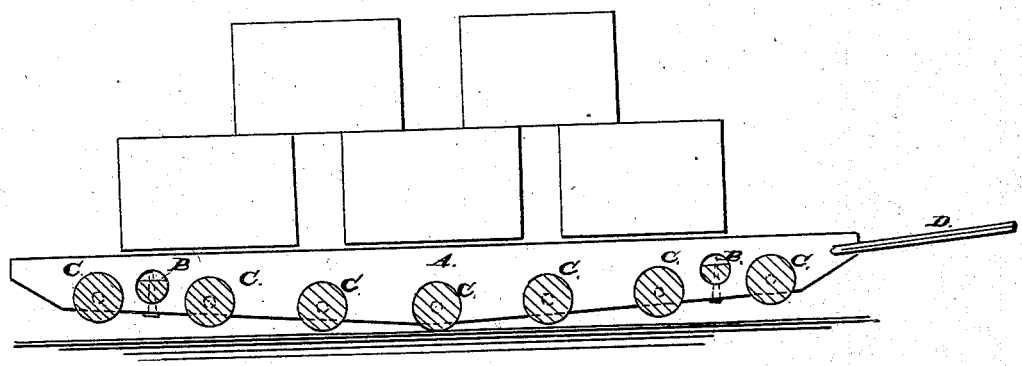
Figure 2:
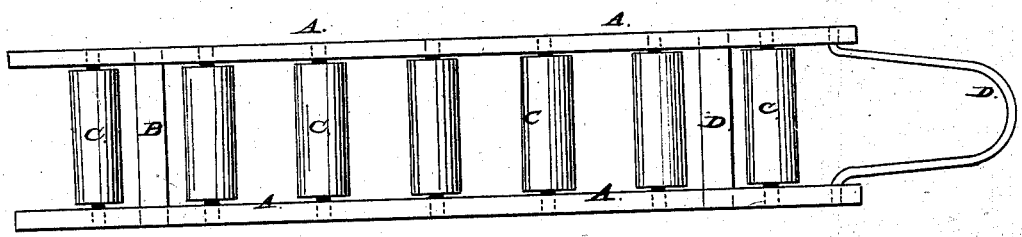

Figure 1 is a vertical central section of my improved skid and friction-roller, and Figure 2 is a plan or top view of the same.

Similar letters of reference indicate corresponding parts.

This invention relates to a device which may be used as a skid for transporting goods from one place to another, and which can be used as a friction-roller for moving goods and facilitating the loading and unloading of carts, etc. The invention consists in the use of a number of rollers, which are hung between two strong bars of suitable length, which bars are arranged parallel with each other, and which are connected by a suitable number of cross-pieces, said rollers projecting over one side of the frame formed by the long and cross-bars.

A represents two bars, of sufficient strength and of suitable length. They are connected by cross-pieces B B, of which any desired number may be arranged. C C are rollers which have their bearings in the bars A, as is clearly shown in the drawing. The rollers project beyond one side of the frame A B, as is clearly shown in fig. 1, and when the device is placed so that the rollers are at or project beyond the bottom (as in fig. 1,) it can be loaded with goods and be transported from one place to another with great facility, being provided with a handle, D for the purpose. When the device is turned over so that the rollers project beyond the top of the frame A B, it can be used for facilitating the moving of goods, or the loading and unloading of wagons. The goods will move easily over the revolving rollers, while the frame remains stationary. The length and shape of the article can be varied to suit the different kinds of work to be done. The rollers can be arranged on the side pieces in a straight or curved line, as may be desired.

Having thus described my invention, I claim as new, and desire to secure by Letters Patent, as an improved article of manufacture—

A combined skid and friction-rollers, made and operated substantially as herein shown and described.

FRANCIS VAN DOREN.

Witnesses:
   WILLARD STEARNS,
   WM. L. GRUNLY.